Sept. 20, 1966 D. L. McCALLUM 3,273,461
APPARATUS AND METHOD FOR MAKING THREE-DIMENSIONAL
CONTOURED ARTICLES
Original Filed Feb. 2, 1962 2 Sheets-Sheet 1
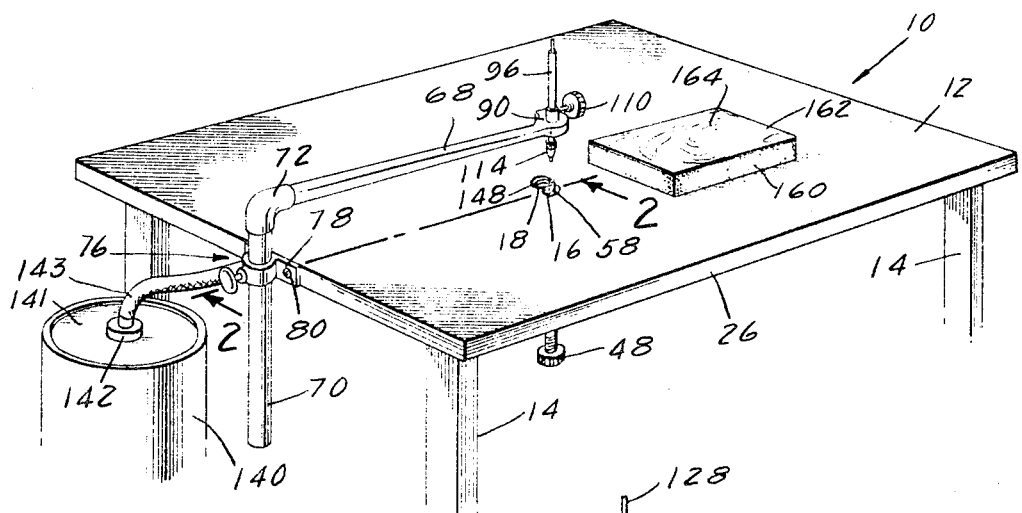
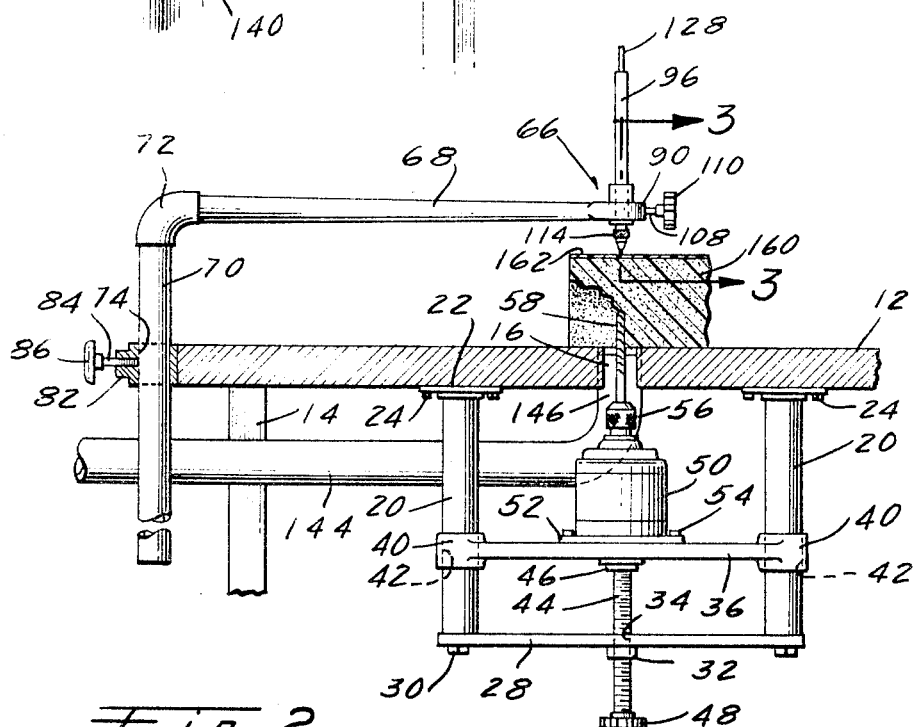
David L. McCallum,
INVENTOR.
BY *JC Baish*
Attorney

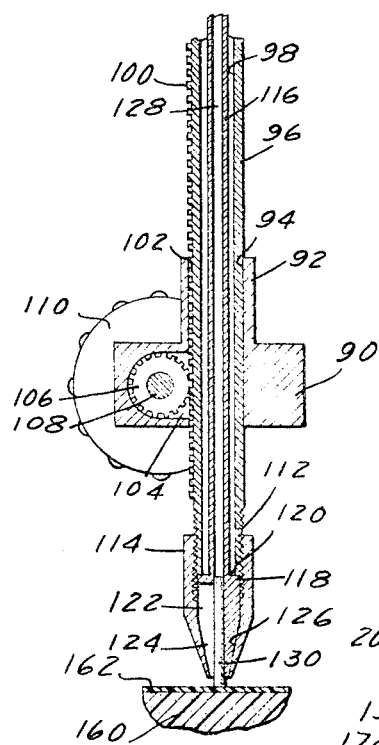
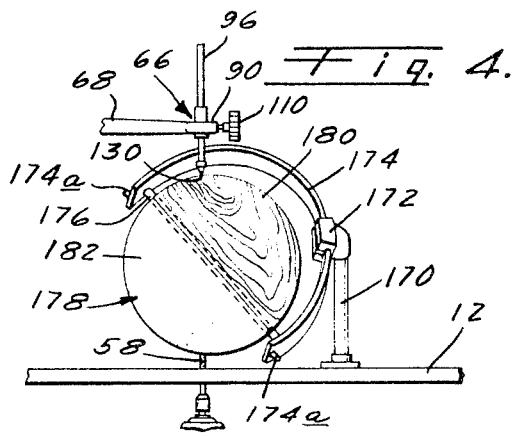
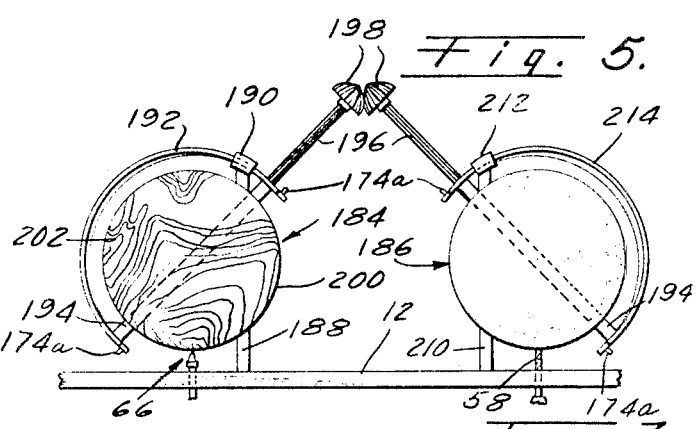
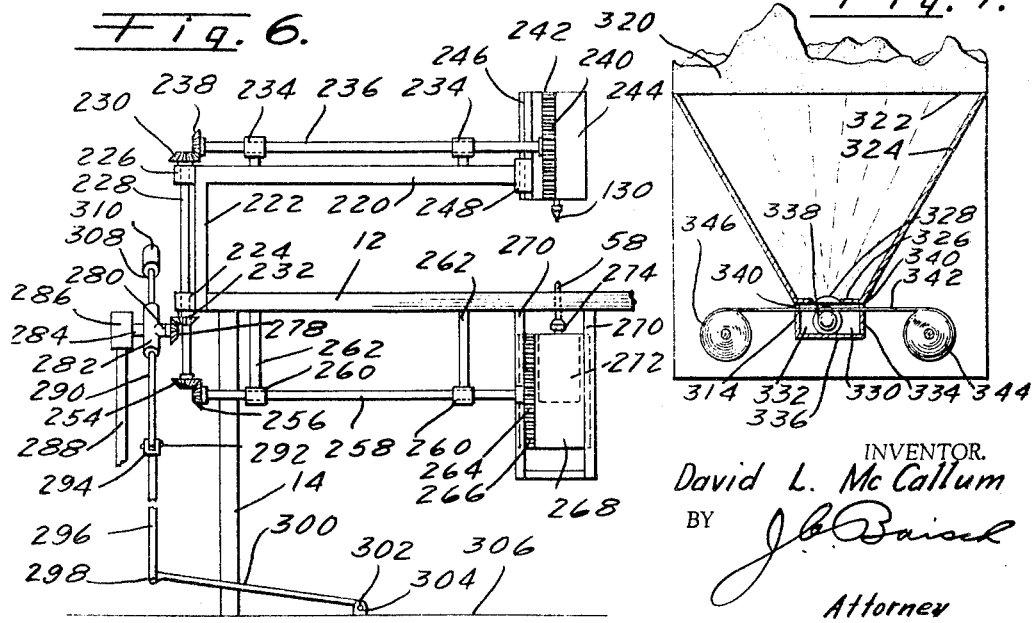

United States Patent Office 3,273,461
Patented Sept. 20, 1966

3,273,461
APPARATUS AND METHOD FOR MAKING THREE-DIMENSIONAL CONTOURED ARTICLES
David Livingston McCallum, P.O. Box 151,
9258 Aero Drive, Pico Rivera, Calif. 90660
Continuation of abandoned application Ser. No. 170,631, Feb. 2, 1962. This application Jan. 14, 1965, Ser. No. 426,480
23 Claims. (Cl. 90—13.1)

This invention relates to apparatus and method for producing three-dimensional articles from patterns. This application is a continuation of my copending application for Apparatus and Method for Making Three-Dimensional Contoured Articles, Serial No. 170,631, filed February 2, 1962, now abandoned.

While the invention has particular utility in connection with the making of three-dimensional relief or contoured terrain maps or models, and is shown and described in such connection, it is to be understood that its utility is not confined thereto.

The production of suitable three-dimensional topographical models of contour maps and the like involve certain problems and difficulties and it is an object of the present invention to provide apparatus and method or process for solving such problems and overcoming said difficulties.

It is another object of the invention to provide apparatus with which a substantial reduction in the time required to produce three-dimensional models, relief or contour maps and the like, will be effected.

It is still another object of the invention to provide apparatus of this character which will make for greater accuracy in the production of such three-dimensional articles.

A further object of the invention is to provide apparatus of this character whereby such models, maps and the like, may be made with optimum uniformity.

A still further object of the invention is to provide apparatus of this character whereby greatly improved work is possible in the making of such three-dimensional articles.

Another object of the invention is to provide apparatus of this character that will make three-dimensional objects or articles from a planar pattern.

Still another object of the invention is to provide apparatus of this character that will carve a three-dimensional article or model from a solid block of material.

A further object of the invention is to provide apparatus of this character wherein there is a fixed guide and a cutting tool in fixed relation to said guide.

It is a still further object of the invention to provide apparatus of this character wherein the guide and the cutting tool are in axial alignment with each other.

It is another object of the invention to provide apparatus of this character wherein the guide and cutting tool are fixed and the material worked upon is movable.

It is still another object of the invention to provide apparatus of this character wherein the block of material worked upon has a contour-map or pattern attached to or impressed upon the top side thereof in cooperable relationship with the guide indicator.

A further object of the invention is to provide apparatus of this character wherein the guide simultaneously marks on the contour-map or pattern on the back of the material the areas being cut or shaped, so that the operator will know what parts of the work material have been cut and what parts remain to be cut. Various marking means may be used, including ink, suitable marking pencils, and the like.

It is still a further object of the invention to provide apparatus of this character wherein there is simultaneous marking of a pattern in exact relationship to an area being cut or shaped.

It is another object of the invention to provide in apparatus of this character means for carrying away the cuttings as the cutting operation is in progress.

It is still another object of the invention to provide apparatus of this character that is relatively simple in construction.

It is a further object of the invention to provide apparatus of this character that is simple and easy to operate.

It is a still further object of the invention to provide apparatus of this character that is reliable in operation.

It is another object of the invention to provide apparatus of this character that is relatively inexpensive to manufacture.

It is still another object of the invention to provide a method whereby the foregoing objects are carried out.

The characteristics and advantages of the invention are further sufficiently referred to in connection with the following detailed description of the accompanying drawings, which represent certain embodiments. After considering these examples, skilled persons will understand that variations may be made without departing from the principles disclosed, and I contemplate the employment of any structures, arrangements, modes of operation, or steps that are properly within the scope of the appended claims.

Referring to the drawings, which are for illustrative purposes only:

FIG. 1 is a perspective view of apparatus embodying the present invention;

FIG. 2 is an enlarged sectional view taken on line 2—2 of FIG. 1 but showing the block of material in working position;

FIG. 3 is an enlarged, sectional view taken on line 3—3 of FIG. 2;

FIG. 4 is a side view of an alternative arrangement;

FIG. 5 is a side view of still another alternative arrangement;

FIG. 6 is a side view of an alternative arrangement for reproducing a three-dimensional article from a three-dimensional pattern; and FIG. 7 is a schematic view of an arrangement for illuminating an article produced by the present apparatus and method.

Referring to FIGS. 1, 2 and 3, there is shown one form of apparatus embodying the present invention. The apparatus comprises a table, indicated generally at 10, having a top 12 supported by legs 14 adjacent the corners of said top. Adjacent the center of the table top 12 there is a vertical opening or hole 16 therethrough and besides said hole 16 is a second hole 18 therethrough.

Beneath the table are a pair of parallel guide members 20, each of which is secured to a plate 22 by any suitable means, such as, for example, welding or brazing, or the like, said plates 22 being secured to the under side of the table top 12 by means of screws 24. The guides 20 are spaced substantially an equal distance from the opening 16 and are parallel to the axis thereof. It is to be noted that the guides 20 are in a plane common with the axis of the opening 16.

At their lower ends the depending guides 20 are braced by a horizontal cross member 28 having openings adjacent the ends thereof for reception of screws 30 which are screwed into tapped openings, not shown, in the lower ends of said guides, said tapped openings extending longitudinally upwardly in said guides. Member 28 is provided with a depending boss 32, there being an internally threaded or tapped opening 34 in axial alignment with the opening 16 in the table top.

A vertically movable motor platform 36 is disposed above the member 28 and said platform is provided at its ends with enlarged bosses 40 having vertical openings 42 therethrough for slidable reception of the guides 20, said bosses thus serving as bearings slidably disposed on the guides 20. Movement of the platform 36 upwardly and downwardly is effected by means of a screw 44 operably disposed in the tapped opening 34 of the member 28. On the under side the motor platform 36 is provided with a plate 46 which rests on the upper end of the screw 44, the lower end of said screw 44 having a knob 48 whereby said screw may be rotated to thereby adjust the vertical position of the motor platform. It is to be noted that while the plate 46 rests on the upper end of the screw 44 so that said screw may be rotated, any other suitable connection may be provided between the upper end of said screw and said motor platform, for example, there may be a socket in the plate 46 for reception of the upper end of the screw 44. Any other suitable connection may also be provided between the screw and said motor platform. It is also to be understood that other means may be used to effect vertical adjustment of said platform 36, as well as guide means therefor.

Motor platform 36 carries an electric motor 50 having a base plate 52 which is attached to the upper side of the motor platform 36 by screws 54 or by any other suitable means, it being noted that said screws 54 are screwed into tapped openings provided therefor in the motor platform, said openings not being shown.

Motor 50 is vertically positioned and is provided at its upper end with a chuck 56 for reception of a cutter element 58, which will also be termed herein a "bit." The bit 58 is axially aligned with the opening upon raising and lowering of the motor platform 36 by means of the screw 44.

Scribing means, indicated generally at 66, is supported adjacent the free end of the horizontal arm 68 disposed in spaced relationship above the table top 12, said arm being connected to the upper end of a vertical support shaft 70 by any suitable means, such as, for example, an elbow 72. The vertical support shaft 70 is slidably disposed in a vertical opening 74 provided therefor in a bracket, indicated generally at 76. Bracket 76 has outwardly extending ears 78 provided with openings therethrough for reception of screws 80 screwed into the adjacent side edge of the table top 12 to thereby secure said bracket to said table top. At the outer side of the bracket 76 there is a boss 82 with a horizontal tapped bore therethrough for threadable reception of a clamping screw 84 having a knob 86 at its outer end whereby said screw may be tightened and loosened. With this arrangement the vertical support shaft 70 may be raised and lowered to thereby effect raising and lowering of the arm 68 and these parts are releasably secured in adjusted positions by the screw 84.

At its outer free end the arm 68 is provided with an enlarged head 90 having an upstanding sleeve 92, there being a vertical passage 94 through said sleeve and head for slidable reception of a tubular body 96 having a longitudinally extending passage 98 therethrough. At one side of the tubular body 96 there is a rack, formed by a plurality of teeth 100 longitudinally spaced apart on said body, said teeth being received in an offset part 102 of the passage 94 through the sleeve 92 and head 90. Head 90 is provided with a recess 104 which extends laterally from the passage 94 and communicates therewith. Within the recess 104 is a gear or pinion 106 attached to a rotatable shaft 108 which extends horizontally through said recess 104, the outer end of said shaft 108 having a knob 110 secured thereto whereby said shaft 108 may be rotated to thereby effect rotation of the gear 106, such rotation of gear 106 effecting upward and downward movement of the tubular body in passage 94 in accordance with the direction of rotation of said gear.

Tubular body 96 has a lower end portion 112 that is externally threaded for threadable reception of a clamping nut 114.

Within the passage 98 of the tubular body 96, there is an ink tube 116 having an outwardly extending annular flange 118 at its lower end which provides a shoulder 120 which abuts against the lower end of the tubular body 96. From the flange 118 there depends a plurality of jaws 122. There are three jaws 122 in the arrangement disclosed in FIG. 3, although any other suitable number of such jaws may be used. Each jaw has a lower end portion 124 which is tapered inwardly and is disposed within an inwardly tapered lower end portion 126 of the nut 114. The nuts 114 in jaws 122 comprise a chuck, similar to a drill chuck.

The inner sides of the jaws 122 are formed so as to normally define arcuate portions of the tubular plane of the inner passage 128 of the ink tube 116. It is to be noted that the jaws 122 are annularly spaced from each other and within the jaws 122 is disposed a piece of felt 130 which is of substantially the same diameter as the diameter of the passage 128 in the ink tube 116. The piece of felt 130 depends somewhat below the lower end of the jaws 122 and is held or clamped in position by said jaws by screwing the nut 114 onto the tubular body 96 sufficient amount to force the lower end portions of the jaws 122 inwardly, it being understood that jaws are resilient.

The diameter of the piece of felt 130 is substantially the same as the diameter of the cutting tool or carver 58, and the assembly of the tubular body 96, ink tube 116, and felt 130, is in axial alignment with the cutter 58. The arrangement is such that various sizes of ink tubes and felt may be used.

Means for carrying away the cuttings comprises a vacuum or suction mechanism, including a tank 140. Any suitable type of pump or means for creating suction or vacuum in the tank 140 may be used.

The top wall 141 of the tank 140 has a nipple 42 for attachment of one end of a hose 143. The other end of hose 143 is connected to a pipe 144 which extends horizontally under the table top 12 and is provided with an upturned end portion 146 which is received in the opening 18 and is secured therein by any suitable means, such as, for example, a press fit or by clamps, not shown, or the like.

The upper free end 148 of the end portion 146 is adjacent the cutter 58 and below the upper plane of the table top so as to draw away cuttings made by the tool as they are being cut.

While the three dimensional model or contour-map is carved from any suitable material, there is shown in FIGS. 1, 2 and 3 a three-dimensional block 160 of "Styrofoam," the expanded polystyrene manufactured by the Dow Chemical Company of Midland, Michigan. The top and bottom surfaces of the block 160 are parallel to each other and a pattern may be impressed on the top surface. However, there is a sheet of material 162 attached to said top surface on which there is provided the usual contour lines or marks, indicated at 164. The sheet of material 162 is attached to the top surface of the block 160 by any suitable means, such as a pressure sensitive tape at the edges, or spots of adhesive of any suitable character. Sheet 162 may be of paper with the contour lines 164 printed thereon or it may be a sheet of plastic material, which is the type of material shown in FIGS. 1, 2 and 3. The pattern may also be attached by pins.

When a three-dimensional model or contour-map is to be made the screw 44 is rotated to raise the motor platform 36 so that the tip or free end of the cutter 58 is raised above the top surface of the table top 12 the desired amount to make the first cutting. A suitable ink is dropped into the passage 128 of the tube 116 and when said ink reaches the lower end thereof it will be absorbed by the felt or felt wick 130. The scriber is raised above the level of the material 162 and the block then disposed thereunder with the contour lines for the first cutting disposed beneath the lower free tip of the felt wick, the block material consequently being properly disposed relative to the cutter 58 due to the axial alignment of said cutter and scriber. The scriber is then lowered by proper rotation of the knob 110 to bring the free tip of the felt wick into contact with the upper surface of the sheet 162 and in proper position relative to the contour lines of the map on said block 160.

The vacuum system is turned on, as well as the motor 50, and the block of material then moved about in accordance with the contour area to be cut or profiled. As the block is moved about, the wick will leave ink on the surface of the map 162, so that the operator will at all times know exactly where the undersurface of the block 160 has been and is being carved. It is to be understood that there is a border area of the under side of the block that is meant to provide a support for the block as the area within this border area is cut, carved, or otherwise profiled. As the carving operation progresses the cuttings are carried away through the pipe or conduit 144 to the tank 140 of the vacuum apparatus.

When the next area is to be cut the screw 144 is actuated to reposition the cutter 58 so that it will cut the under side of the block 160 in accordance with the elevation indicated by the map 162. This process will be carried out to cut the various areas in accordance with the contour lines of the map on the top surfaces of said block.

When the three-dimensional model or contour-map has been finished the knob 110 is rotated to raise the scriber and the screw 44 is rotated to lower the motor to a point whereat the tip of the cutter 58 is below the top plane of the table top so that the block of material 160 may be easily removed from the cutting position.

Since the material or work is moved on the top surface of the table top 12 between the cutter and the scriber, the apparatus is of extremely simple construction.

After the three-dimensional model or contour-map has been removed from the operating position the contour-map 162 is removed. When the sheet 162 is of plastic material the ink that has been applied thereto by the felt wick 130 of the scriber may be removed by any suitable ink-removing material. There are various well known types of ink that will meet present requirements and there are well known ink-removers that will remove such ink from the plastic sheet 162, so that said sheet may be used over again if desired.

It is to be understood, of course, that the pattern may be three-dimensional, as well as two-dimensional.

Referring to FIG. 4, there is shown an alternative arrangement wherein table top 12 has attached thereto an upright support member 170 which has at its upper end a bearing 172 having a longitudinally extending opening for slidable reception of an arcuately shaped holder 174. It is to be noted that the holder 174 is disposed at a rearwardly inclined angle to provide clearance for the longitudinally adjustable tubular scriber parts including the tubular body 96, said scriber also having the felt wick 130 at the lower end thereof.

Holder 174 has a shaft 176 which extends diametrically through a spherical piece of material, indicated generally at 178. The ends of the shaft 176 are attached to the holder 174 adjacent the free ends thereof and said globe 178 is adapted to rotate on said shaft which provides an axis therefor.

Bearing 172 is split at 172a so that the end portions of shaft 172 may pass therethrough to permit full 180° sliding movement in said bearing. The ends of the holder 174 are provided with stop screws which limit sliding movement of said holder 174 in bearing 172. When it is desired to remove the holder 174 one of the screws 174a is removed and the holder slipped from said bearing 172.

Half of the globe 178 is provided with a suitable contour-map 180 which may be of paper or suitable sheet plastic. The other half of the globe 178, indicated at 182, is the part to be carved by the cutter 58. Here again the cutter 58 and the scriber 96 are in axial alignment with each other and the globe 178 may be rotated so that the scriber 130 will ink the various parts of the map 180 as the part 182 of the globe is being cut by said cutter.

In FIG. 5, there is shown an arrangement wherein there are a pair of globes, indicated generally at 184 and 186, respectively.

Globe 184 is provided with an upright support member 188 having its lower end attached to the table top 12 and having at its upper end a bearing 190 having a passage therethrough for slidable reception of an arcuate shaped holder 192. A tubular member 194 has its ends rotatably supported in free end portions of the holder 192, the interior passage through said member having ridges or splines for slidable reception of a splined shaft 196 which carries a gear 198 at the outer free end thereof. Secured on the tubular member 194 is a globe 200 which is so attached to the member 194 as to rotate therewith and not be rotatable thereon. Globe 200 is provided with a contour-map surface 202 which may be of a similar character to the map 180 except that the map 202 covers the entire surface of said globe 200. In this arrangement the scriber or scribing means 66 extends upwardly through a hole, not shown, in the table top 12 and is adjustably arranged for adjustable movement toward and away from the globe 200 by any suitable means, such as the mechanism already described in connection with the arrangements shown in FIGS. 1, 2 and 3.

A support 210 has its lower end secured to the table top 12 in the same manner as the supports 188 and 170. At the upper end of support 210 there is a bearing 212 having a passage therethrough for slidable reception of a holder 214 similar to the holder 192. A tubular member 194 is provided for the holder 214 and slidably receives a splined shaft 196 which carries at its free outer end a gear 198.

Cutter 58, which extends through the table top 12, as in the arrangement shown in FIGS. 1, 2 and 3, cuts the globe 186 and carves same into a three-dimensional model or contour-map. With this arrangement the entire globe 186 may be contour surfaced in accordance with the map provided on the globe 184.

The gears 198 are so contoured that the globes 186 may be rotated or moved arcuately within the sliding limits of the holders 192 and 214 in their bearings 190 and 192, respectively. It is to be noted that the gears 198 are so shaped that as the holders 192 and 214 slide in their bearings toward or away from each other the teeth of the gears 198 will remain in mesh and since the gears are moved vertically upwardly and downwardly as said holders are slidably moved in their bearing, the shafts 196 will extend or telescope relative to the tubular members 194, respectively. Thus the globes 184 and 186 are kept in the same relationship relative to each other.

Various means may be employed to maintain the gears 198 in mesh with each other. One such means comprises magnetizing the shafts 196 and gears 198 so that the gears 198 will magnetically maintain contact with each other as the holders 192 and 214 are actuated.

With this arrangement it is to be noted that only one of the holders need be actuated. Primarily the holder 192 would be moved in its bearing 190 in accordance with the map 200 which served as the pattern for the cutting of the globe 186. Due to the magnetic attraction of the gears 198 for each other, movement of the holder 192 will automatically cause corresponding movement of the holder 214.

Referring to FIG. 6, there is shown an arrangement whereby the pattern for the three-dimensional model is a three-dimensional article.

An arm 220 is supported by an upright member 222 in upwardly spaced parallel relationship to the table top 12. The lower end of support member 222 is secured to one end of the table top and is provided with vertically spaced bearings 224 and 226. Rotatably supported in the bearings 224 and 226 is a shaft 228 having a bevel gear 230 attached to the upper end adjacent the bearing 226 and a bevel gear 232 attached to said shaft at the lower end of bearing 224. The gears 230 and 232 are disposed adjacent the respective bearings 226 and 224 so that said shaft 228 will not have longitudinal movement in said bearings. Details of the arrangement shown in FIG. 6 are not shown since this is a schematic showing of this apparatus.

Arm 220 carries a pair of bearings 234 in longitudinally spaced relationship and operably received in said bearings is a shaft 236 which has a gear 238 attached to the left hand end, as shown in FIG. 6, said gear 238 also being a bevelled gear which meshes with the bevelled gear 230. At the opposite end shaft 236 is provided with a gear 240 which meshes with the teeth of a rack 242 extending vertically on a member 244 which has a vertical portion 246 slidably disposed in a bearing 248 provided therefor and carried at the free end of the arm 220. Member 244 is provided with a scriber arrangement which includes the tubular body 96 and tube 116 which carries the chuck arrangement at the lower end, said chuck arrangement having the felt wick 130. It is to be noted that the scriber assembly is secured to the member 244 so that such scriber assembly and member 244 move together.

Shaft 228 extends downwardly below the bevel gear 232 and at the lower free end of said shaft 228 there is secured a bevel gear 254 which meshes with a bevel gear 256 secured to the adjacent end of a shaft 258. The shaft 258 is rotatable in bearing 260 which are spaced apart longitudinally of said shaft and which are carried at the lower ends of support member 262 having their upper ends secured to the table top 12 by any suitable means, such as screws or the like, not shown. Shaft 258 extends rightwardly of the right hand bearing 260 and has secured to its adjacent free end a gear 264 which meshes with the teeth of a rack 266 at the side of a motor carrier plate 268 which has edge portions slidable vertically in guides 270 which have their upper ends secured by any suitable means to the underside of the table top 12.

A motor 272 is secured by any suitable means to the carrier plate 268, so that said motor is moved upwardly and downwardly with the corresponding movements of plate 268. Motor 272 is provided with a chuck 274 in which is secured a cutter 58.

Means for rotating the various shafts of the mechanism of FIG. 6 and, hence, effecting movement of the member 244 and motor carrying plate 268 towards and away from each other is provided and includes a bevel gear 278 secured to a lateral projection 280 on a sleeve 282. An oppositely arranged shaft 284 is secured to sleeve 282 in axial alignment with the gear 278, the outer end of said shaft 284 being operably disposed in a bearing 286 secured to any suitable support means by a support member 288 and arm 290 has one end disposed in the sleeve 282 and secured therein by any suitable means, such as a set screw, not shown. The opposite end of arm 290 is mounted on a pivot pin 292 which extends between the side members or ears of a yoke 294, the pivoted end of said arm 290 being operably disposed between the arms of said yoke. Yoke 294 has a depending connecting member 296 having a pivotal connection 298 to a treadle 300. The end of the treadle 300 opposite the pivot 298 is pivotally connected at 302 to a member 304 which is secured by a suitable means, such as screws or the like, to the floor or other suitable support, indicated at 306. At the end of sleeve 282 opposite the arm 290 there is a shaft 308 carrying at its free end a weight 310 to counterbalance the weight of the parts operably connected to the opposite end of said sleeve 282. This counterbalancing weight is sufficiently heavy to raise the treadle and correspondingly operate the treadle actuated parts. Alternatively a spring may be used for this purpose.

In operation, with the cutter 58 disposed below the level of the surface of the table top 12, a piece of material to be contoured or cut is disposed between said cutter and the scriber. The scriber is adjustable vertically by mechanism such as that shown in FIG. 3. The tip of the cutter 58 is then moved to be in substantially the plane of the top surface of the table top 12, such adjustment being effected by suitable movement of the treadle 300. Since the pattern is three-dimensional and is secured to the top surface of the piece of material to be carved, the scriber is adjusted vertically so that the lower end of said scriber contacts the highest point of said pattern. Thereafter movement of the treadle downwardly will cause the member 244 and motor plate 268 to move toward each other, the adjustment being determined in accordance with the upper surface of the pattern. It will be obvious that the block of material to be carved is moved about on the top surface of the table top 12 between the scriber and cutter and as said material, with the pattern secured to the top surface thereof, is moved about the treadle to effect adjustment of the scriber and cutter toward and away from each other in accordance with the profile of the three-dimensional pattern to thereby reproduce on the under surface of the block a corresponding profile.

Referring to FIG. 7, there is shown an arrangement for illuminating a model 320 of material which will transmit light, at least to a limited extent. The model as shown in FIG. 7 is of the above referred to "Styrofoam," which will permit a certain amount of light to pass therethrough.

The translucent model 320 is disposed at the open free end 322 of a projector element 324, which may be of any suitable material, such as metal, for example. The projector element is hollow and the open end 322 is of substantially the same shape and size as the bottom of the model 320, said element 324 having diverging walls, at least at the sides, from a wall 326 having an opening therein for reception of a lens 328. Below the wall 326 is a compartment 330 defined by side walls 332, end walls 334 and a bottom wall 336. Within the compartment 330 is a source of light to be projected through the lens 328 and into the model 320.

End walls 334 of the compartment or chamber 330 have slots 340 therein which are arranged horizontally as shown in FIG. 7, and slidably receive therein a slip of film 342 which is rolled on a spool 344 provided therefor and rollable onto another spool 346 at the side of the chamber 330 opposite the spool or reel 344. Film 342 is colored and the light from the bulb 338 passes through that portion of the film between the light source and lens 328 and upwardly within the projector element 324 into the model 320.

Film 342 may have various color schemes thereon and by projecting light through various predetermined portions of said film the model 320 may be so illuminated from beneath, and by light passing therethrough, as to give various visual information relative to a particular area. For example, various sections of the film 342 may be provided with certain coloring so that population growth may be shown on the model 320. Any other information may be provided by lighting means.

It is to be understood of course that the model 320 may be illuminated from the profiled side by direct lighting, for example, and various features and information may be provided by such illumination.

Besides the materials and characteristics thereof described above it is to be understood that the model may be made of any suitable material that may be carved and may be impervious to light as well as capable of light transmission. Where the material is impervious to light, external lighting may be employed, as above indicated for the other type or types of models.

The cutter or bit 58 may be of any suitable type, such as, for example, a router kit. Further, various sizes or diameters of bits may be used. The felt wick should be of substantially the same diameter as the diameter of the bit and when a different size of bit is used with the carrying portion, including the ink tube 116 of the scriber, is changed to provide a wick of a corresponding diameter to that of the bit. It will be obvious that the ink tube and jaws carried thereby may be readily changed by removing the clamping nut 114 and sliding said tube 116 out of the tube 96. After the tube 116 has been replaced with one having the proper diameter of wick, the clamping nut 114 is replaced.

For some types of work it is necessary to place the pattern with the side carrying the information down, as, for example, on the piece of material being worked on. When this arrangement is used it is necessary, of course, for the operator to see the material carried by the pattern. Such material may be of such character that the information on one side cannot be seen on the reverse side and it is therefore necessary to treat such material so as to permit the information on the under side to be seen from the opposite side, so that the scriber may be used as hereinabove described.

In many cases the pattern is on paper and the paper may be rendered transparent enough to permit the information on one side to be seen for the opposite side by treating same with turpentine, for example. The turpentine treatment has been found to give excellent results but of course other things may be used to treat the material of the pattern to render it transparent.

For some purposes the information, such as the contour lines, for example, may be printed on a sheet of transparent plastic and the plastic sheet is attached to the material being cut with the information side down.

The reason for having the pattern with the information side down, either attached to the top side of the block of material to be cut or mounted separately from the block, is that the under side of the block is cut or carved. Consequently, when a contour map has been made of a particular topographical area and it is desired to reproduce the area three-dimensionally from the contour map or pattern, the information on the latter must be placed downwardly relative to the material being carved or cut. Otherwise the three-dimensional model will be in reverse to the actual formation of the area.

Should it be desired to use the model as a mold for casting or otherwise reproducing an area in three dimensions, the information on the contour map or pattern or the like would be placed on the block or otherwise with the information on the upper side.

The invention and its attendant advantages will be understood from the foregoing description and it will be apparent that various changes may be made in the process or method and the form, construction and arrangement of the parts of the apparatus of the invention without departing from the spirit and scope thereof or sacrificing all of its material advantages, the arrangements hereinbefore described being merely by way of example.

I claim:
1. In apparatus for making three-dimensional profiled articles, comprising:
   (A) workpiece support means for operably supporting a workpiece to be profiled,
      (a) said support having an opening therethrough normal to the plane of said support;
   (B) a rotary cutting element extending through said opening;
   (C) power means for rotating said cutter element;
   (D) means for effecting relative movement between said cutter element and support means,
      (a) whereby said cutter element may be adjustably moved through said opening to various elevations relative to the top surface of said support means;
   (E) a scriber support extending in parallel spaced relation to the support means;
   (F) a scriber in axial alignment with said cutter element,
      (a) and spaced axially therefrom,
      (b) said scriber including a wick for ink,
      (c) and a tubular reservoir for supplying ink to said wick;
   (G) means for axially moving said scriber toward and away from said cutter element;
   (H) suction means for removing cuttings,
      (a) said suction means including an inlet conduit having an inlet opening adjacent the cutter element;
   (I) a workpiece slidably supported on said support therefor,
      (a) said workpiece having its top and bottom sides parallel with the bottom side slidable on said workpiece support means;
   (J) and a pattern attached to the top surface of said workpiece.

2. In apparatus for making three-dimensional profiled articles, comprising:
   (A) workpiece support means for operably supporting a workpiece to be profiled,
      (a) said support having an opening therethrough normal to the plane of said support;
   (B) a rotary cutting element extending through said opening;
   (C) power means for rotating said cutter element;
   (D) means for effecting relative movement between said cutter element and support means,
      (a) whereby said cutter element may be adjustably moved through said opening to various elevations relative to the top surface of said support means;
   (E) a scriber support extending in parallel spaced relation to the support means;
   (F) a scriber in axial alignment with said cutter element,
      (a) and spaced axially therefrom,
      (b) said scriber including a wick for ink,
      (c) and a tubular reservoir for supplying ink to said wick;
   (G) means for axially moving said scriber toward and away from said cutter element;
   (H) a workpiece slidably supported on said workpiece support,
      (a) said workpiece having its top and bottom sides parallel with the bottom side slidable on said workpiece support means;
   (I) and a pattern attached to the top surface of said workpiece.

3. In apparatus for making three-dimensional profiled articles, comprising:
   (A) material support means for operably supporting material to be profiled,
      (a) said support having an opening therethrough normal to the plane of said support;
   (B) a rotary cutting element extending through said opening;
   (C) power means for rotating said cutter element;
   (D) means for effecting relative movement between said cutter element and support means, (a) whereby said cutter element may be adjustably moved through said opening to various elevations relative to the top surface of said support means;
(E) scriber support means;
(F) a scriber in operable alignment with said cutter element,
   (a) and spaced therefrom,
   (b) said scriber including a wick for ink,
   (c) and a reservoir for supplying link to said wick;
(G) and means for axially moving said scriber toward and away from said cutter element.

4. In apparatus for making three-dimensional profiled articles, comprising:
(A) material support means for operably supporting material to be profiled,
   (a) said support having an opening therethrough normal to the plane of said support;
(B) a rotary cutting element extending through said opening;
(C) power means for rotating said cutter element;
(D) means for effecting relative movement between said cutter element and support means,
   (a) whereby said cutter element may be adjustably moved through said opening to various elevations above the top surface of said support means;
(E) scriber support means;
(F) and a scriber in operable relation to said cutter element,
   (a) said scriber including a wick for ink,
   (b) and a reservoir for supplying ink to said wick.

5. In apparatus for making three-dimensional profiled articles, comprising:
(A) material support means for operably supporting material to be profiled,
   (a) said support having an opening therethrough normal to the plane of said support;
(B) a rotary cutting element extending through said opening;
(C) power means for rotating said cutter element;
(D) means for effecting relative movement between said cutter element and support means,
   (a) whereby said cutter element may be adjustably moved through said opening to various elevations relative to the top surface of said support means;
(E) a scriber support extending in parallel spaced relation to the support means;
(F) and a scriber in operable relationship relative to said cutter element,
   (a) said scriber including means for putting a visual marking on a flat pattern to show the part over which the scriber has passed.

6. In apparatus for making three-dimensional profiled articles:
(A) material support means for operably supporting material to be profiled;
(B) a rotary cutting element;
(C) power means for rotating said cutter element;
(D) means for effecting relative movement between said cutting element and support means,
   (a) whereby said cutting element may be adjustably moved to various elevations relative to the top surface of said support means;
(E) scriber support means;
(F) and a scriber operably related to said cutting element, said scriber being arranged for marking on a pattern to show where said scriber has engaged said pattern.

7. In apparatus for making three-dimensional articles:
(A) material support means for operably supporting material to be profiled, said support means comprising an arcuate holder;
(B) guide means in which said arcuate holder is slidably mounted;
(C) support means for said guide means;
(D) a spherical piece of material to be profiled rotatably mounted within said arcuate holder;
(E) a pattern covering a portion of said spherical material;
(F) a rotary cutting element;
(G) power means for rotating said cutter element;
(H) means for effective relative movement between said cutter element and support means,
   (a) whereby said cutter element may be adjustably moved to various elevations relative to said support means;
(I) scriber support means;
(J) and a scriber operably related to said pattern, said scriber being arranged for making on said pattern to show where said scriber has engaged said pattern.

8. In apparatus for making three-dimensional articles:
(A) a pair of material support means for operably supporting material to be profiled, each of said support means comprising an arcuate holder;
(B) guide means for each of said arcuate holders, said holders being slidably mounted in respective guide means;
(C) support means for said guide means;
(D) a spherical piece of material to be profiled rotatably mounted within one of said arcuate holders;
(E) a spherical pattern element rotatably mounted in the other arcuate holder;
(F) a rotary cutting element;
(G) power means for rotating said cutting element;
(H) means interconnecting the spherical piece of material and said spherical pattern element for corresponding and simultaneous rotation thereof;
(I) scriber support means;
(J) and a scriber operably related to said pattern, said scriber being arranged for marking on said pattern to show where said scriber engaged said pattern.

9. In apparatus for making three-dimensional profiled articles:
(A) material support means for operably supporting material to be profiled;
(B) a rotary cutting element;
(C) power means for rotating said cutter element;
(D) a scriber operably related to said cutting element;
(E) and means for simultaneously moving said cutting element and said scriber toward and away from each other.

10. A method of forming a profiled three-dimensional article, comprising the steps of:
(A) attaching a two-dimensional flat pattern to one side of a piece of material to be formed into a three-dimensional, profiled article;
(B) supporting said piece of material between a cutter element and a marking element;
(C) adjusting said cutting element and marking element to bring the cutting element into cutting engagement with said piece of material and the marking element in engagement with said pattern;
(D) simultaneously cutting said material into a three-dimensional product and marking on said pattern a visual indication of that part of the material cut;
(E) and sucking the cuttings away from the cutting area.

11. A method of forming a profiled three-dimensional article, comprising the steps of:
(A) attaching a flat pattern to one side of a piece of material to be formed into a three-dimensional, profiled article;
(B) supporting said piece of material between a cutter element and a marking element;
(C) adjusting said cutting element and marking element to bring the cutting element into cutting engagement with said piece of material and the marking element in engagement with said pattern;

(D) and simultaneously cutting said material into a three-dimensional product and marking on said pattern a visual indication of that part of the material cut.

12. A method of forming a profiled three-dimensional article, comprising the steps of:
(A) supporting a piece of material to be formed into a three-dimensional, profiled article between a cutter element and a marking element;
(B) cutting said piece of material in accordance with a pattern;
(C) and marking on said pattern an indication of that part of the material cut.

13. The method of forming a profiled three-dimensional article, comprising the steps of:
(A) cutting a piece of material;
(B) and marking on a pattern a visual indication of that part of the material cut.

14. The invention defined by claim 13 wherein the cuttings of said material and marking on said pattern is effected simultaneously.

15. In apparatus for making three-dimensional articles:
(A) a pair of material support means for operably supporting material to be profiled, each of said support means comprising an arcuate holder;
(B) guide means for each of said arcuate holders, said holders being slidably mounted in respective guide means;
(C) support means for said guide means;
(D) a spherical piece of material to be profiled rotatably mounted within one of said arcuate holders;
(E) a spherical pattern element rotatably mounted in the other arcuate holder;
(F) a rotary cutting element;
(G) power means for rotating said cutting element;
(H) means interconnecting the spherical piece of material and said spherical pattern element for corresponding and simultaneous rotation thereof;
(I) and a scriber operably related to said cutter element, said scriber being arranged for marking on said pattern to show where said scriber has engaged said pattern.

16. In apparatus for making three-dimensional profiled articles:
(A) material support means for operably supporting material to be profiled;
(B) a rotary cutting element;
(C) power means for rotating said cutter element;
(D) a marking scriber operably related to said cutting element;
(E) and means for effecting simultaneous movement of said cutter element and said scriber.

17. In apparatus for making three-dimensional profiled articles:
(A) material support means for operably supporting material to be profiled;
(B) a rotary cutting element operably related to said support means for cutting said material;
(C) power means for rotating said cutter element;
(D) means for effecting relative movement between said cutter element and support means,
  (a) whereby said cutter element may be adjustably moved relative to material supported by said support means;
(E) a scriber operably associated with said cutter element;
(F) and a transparent pattern having scriber guide information on one side, the opposite side being exposed to and facing the scriber.

18. A method of forming a profiled three-dimensional article, comprising the steps of:
(A) treating a piece of opaque sheet material having guide information on one side to render said information visible from the other side;
(B) supporting a workpiece for operation thereon by a cutter element;
(C) and operating said cutting element on a workpiece in accordance with the guide information as seen from said other side of said sheet material.

19. In apparatus for making three-dimensional articles:
(A) support means for operably supporting material to be profiled comprising
  (1) means for rotating a workpiece in
  (2) an arcuate holder slidably mounted in
  (3) a guide having a
  (4) support;
(B) a rotary cutting element movable toward and away from said piece of material;
(C) power means for rotating said cutter element;
(D) scriber support means;
(E) and a scriber operably related to said cutting element, said scriber being arranged for marking on a pattern to show where said scriber has engaged said pattern.

20. In apparatus for making three-dimensional articles:
(A) support means for operably supporting material to be profiled comprising:
  (1) means for rotating a workpiece in
  (2) an arcuate holder slidably mounted in
  (3) a guide having a
  (4) support;
(B) a rotary cutting element movable toward and away from said piece of material;
(C) power means for rotating said cutter element;
(D) scriber support means;
(E) a pattern support means for operably supporting a pattern comprising
  (1) a rotatable pattern in
  (2) an arcuate holder slidably mounted in
  (3) a guide having a
  (4) support;
(F) a scriber operably related to said cutting element, said scriber being arranged for marking on a pattern to show where said scriber has engaged said pattern;
(G) and means interconnecting said workpiece support means and pattern support means to effect simultaneous and correlated rotation thereof.

21. In apparatus for making three-dimensional articles:
(A) support means for operably supporting material to be profiled comprising
  (1) means for rotating a workpiece in
  (2) an arcuate holder slidably mounted in
  (3) a guide having a
  (4) support;
(B) a rotary cutting element movable toward and away from said piece of material;
(C) power means for rotating said cutter element;
(D) scriber support means;
(E) a pattern covering a portion of said rotatable workpiece;
(F) and a scriber operably related to said cutting element, said scriber being arranged for marking on a pattern to show where said scriber has engaged said pattern.

22. In apparatus for making three-dimensional articles:
(A) a pair of support members;
(B) a guide carried by each support member;
(C) an arcuate holder slidably mounted in each of said guides;
(D) a tubular member between the ends of said arcuate holders;
(E) a shaft slidably mounted in each tubular member and projecting through one end of respective holders;
(F) gear heads on the protruding ends of said shafts magnetically attracted to each other so as to rotate around and move along axes simultaneously;
(G) and means for preventing relative rotation between shafts and their respective tubular members.

23. In apparatus for making three-dimensional articles:
(A) a pair of support members;
(B) a guide carried by each support member;
(C) an arcuate holder slidably mounted in each of said guides;
(D) a tubular member between the ends of said arcuate holder;
(E) a shaft slidably mounted in each tubular member and projecting through one end of respective holders;
(F) gear heads on the protruding ends of said shafts attached to each other so as to rotate around and move along axes simultaneously;
(G) and means for preventing relative rotation between shafts and their respective tubular members.

References Cited by the Examiner

UNITED STATES PATENTS

| | | | |
|---|---|---|---|
| 1,907,250 | 5/1933 | Shaver | 90—13.2 |
| 2,185,708 | 1/1940 | Meyerricks | 40—126 |
| 2,448,906 | 9/1948 | Manao et al. | 40—126 |
| 2,702,496 | 2/1955 | Davis et al. | 90—13.1 |
| 2,987,971 | 6/1961 | Raines et al. | 90—13.2 |
| 2,023,647 | 3/1962 | Bawtinheimer | 90—62 |
| 3,137,209 | 6/1964 | Green et al. | 90—13.1 |

WILLIAM W. DYER, JR., *Primary Examiner.*

G. A. DOST, *Assistant Examiner.*